Nov. 10, 1925.
P. E. HUNTER
1,560,820
APPARATUS FOR WELDING METAL
Filed April 2, 1923
3 Sheets-Sheet 1
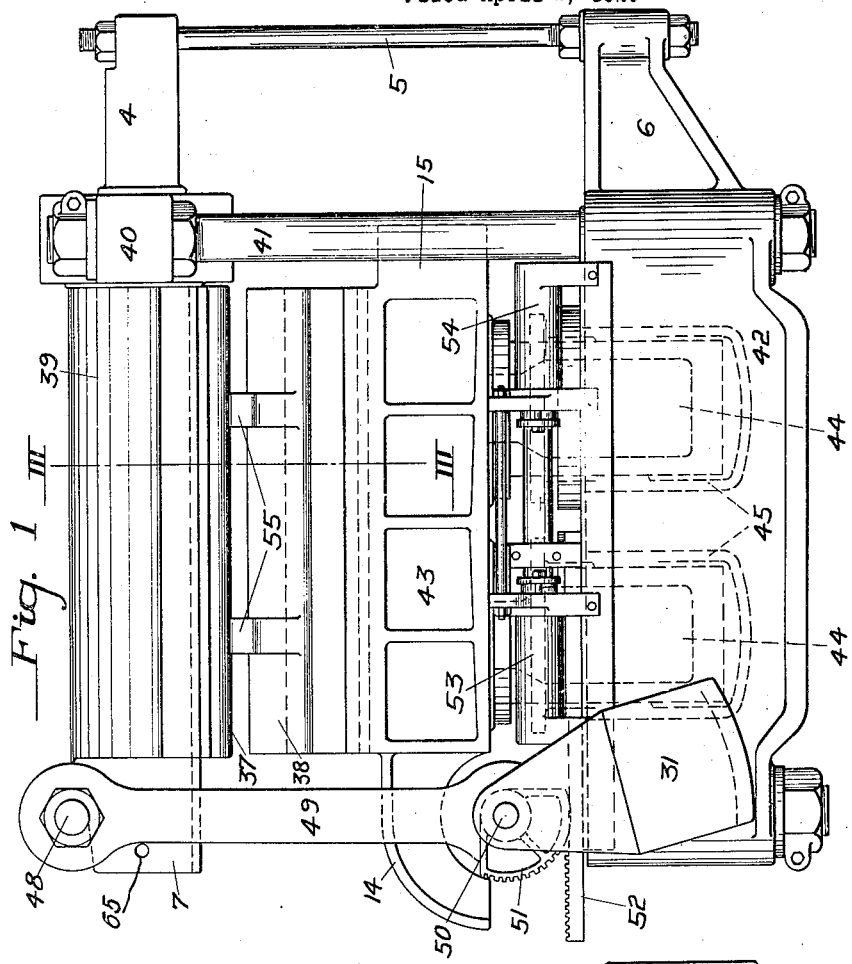
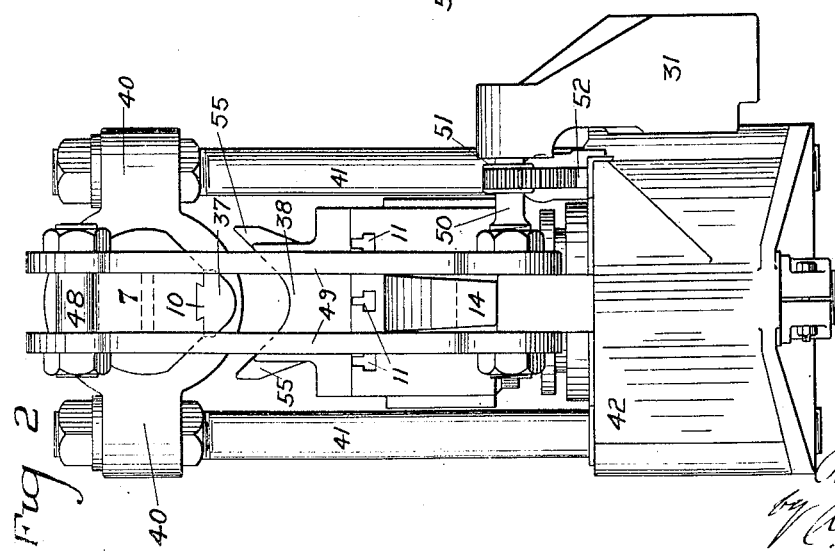
INVENTOR
Percy E. Hunter,
by C. M. Cracko
Atty.

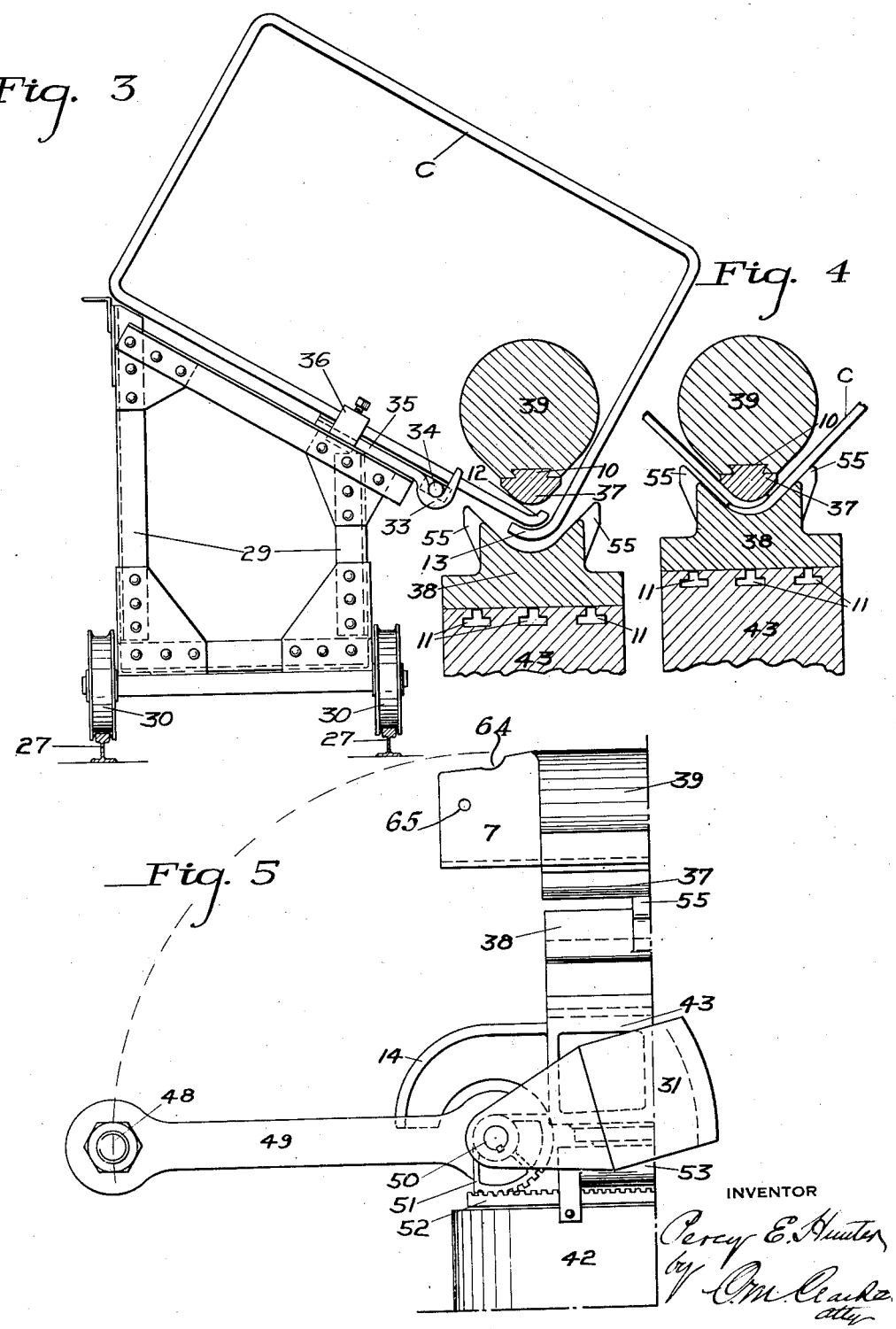

Nov. 10, 1925.    1,560,820
P. E. HUNTER
APPARATUS FOR WELDING METAL
Filed April 2, 1923    3 Sheets-Sheet 3
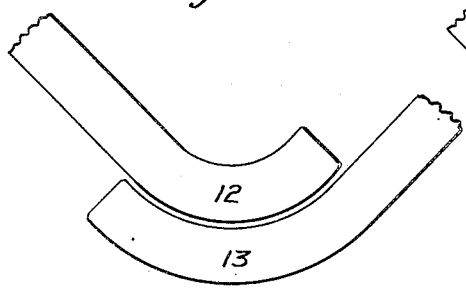
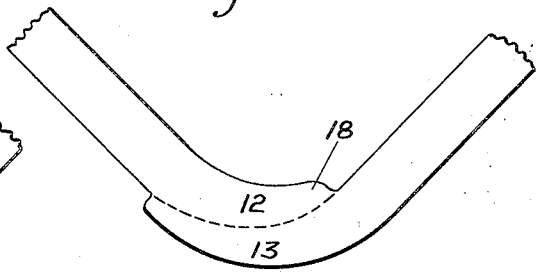
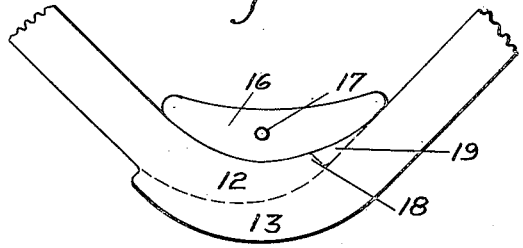
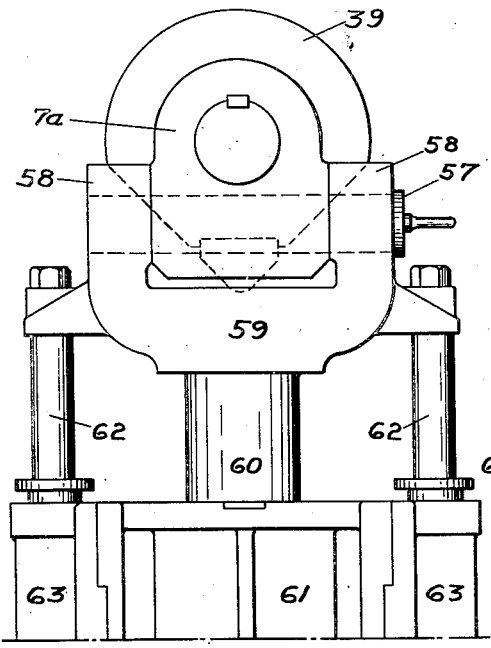
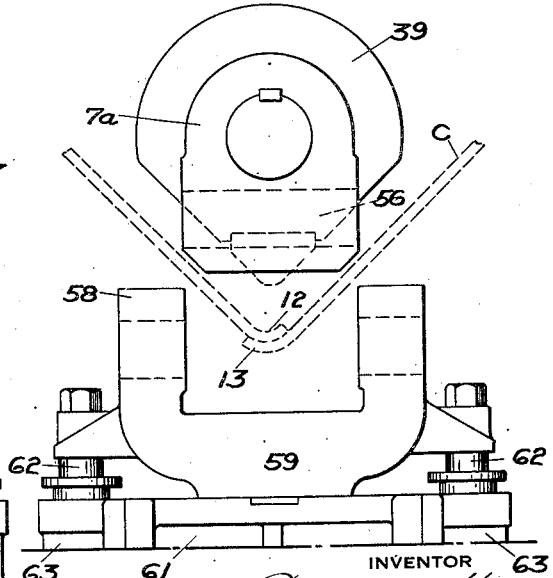
INVENTOR
Percy E. Hunter
by C. M. Clarke
atty Patented Nov. 10, 1925.

1,560,820

UNITED STATES PATENT OFFICE.

PERCY E. HUNTER, OF PITTSBURGH, PENNSYLVANIA, ASSIGNOR TO PITTSBURGH ANNEALING BOX COMPANY, OF PITTSBURGH, PENNSYLVANIA, A CORPORATION OF PENNSYLVANIA.

APPARATUS FOR WELDING METAL.

Application filed April 2, 1923. Serial No. 629,257.

*To all whom it may concern:*

Be it known that I, PERCY E. HUNTER, a citizen of the United States, residing at Pittsburgh, in the county of Allegheny and State of Pennsylvania, have invented certain new and useful Improvements in Apparatus for Welding Metal, of which the following is a specification.

My invention relates to the art of welding metals, and consists of an improvement in apparatus therefor, as hereinafter described.

It has in view to effect the welding of adjacent faces of metal bodies while hot by direct continuous pressure, by subjecting them to the action of opposing dies, as contrasted to hammering, rolling, or other methods in which the metal is subjected to intermittent, progressive, or alternating blows or pressure. In the specific application of the invention, as herein disclosed, it is shown as applied to the welding of the seam of a formed blank for making annealing boxes or the like, but the invention is, of course, applicable to other forms or shapes, as will be understood by those skilled in the art.

In the accompanying drawings, illustrating such application,

Fig. 1 is a view in side elevation of a machine adapted to utilize the invention in the making of annealing boxes;

Fig. 2 is a view of the machine in end elevation;

Fig. 3 is a cross section of the machine on the line III—III of Fig. 1, showing the welding dies open and the blank in position;

Fig. 4 is a similar view showing the dies closed under pressure;

Fig. 5 is a partial view in elevation, similar to Fig. 1, showing the retaining arms for the upper die block lowered for insertion of the blank;

Figs. 6 and 7 are enlarged sectional detail views of the overlapping ends of the blank before and after the welding operation, respectively;

Fig. 8 is a similar view, showing the use of a supplemental swaging die; and

Figs. 9 and 10 are views in end elevation, showing a modified construction, in closed and open position respectively.

The welding machine illustrated is particularly adapted to the welding of the overlapping curved edge portions of the shaped blank for completing the seam of a rectangular body, as the sides and ends of an annealing box. Such blank C is first bent from a flat plate at the three integral corners, leaving the curved overlapping ends 12, 13, as shown. The blank in such form is then mounted by trunnion necks 34, of temporary holding plate 35 secured by clamps 36 in the open top trunnion bearings 33 of buggy 29, as more particularly shown and described in my companion application filed herewith, Serial No. 629,256, filed April 2, 1923. Thus mounted on the serving buggy, the blank is carried by buggy wheels 30 over tracks 27 from the heating furnace for location of the overlapping ends 12—13 between the co-acting stationary and movable dies 37 and 38 of the machine.

Stationary die 37 is mounted along the under side of a supporting horn or anvil block 39. The anvil block 39 is mounted at one end portion of the machine by a crosshead 40 upon columns 41 extending upwardly from the main foundation frame 42, and is provided with a narrowed extended opposite end 7. Movable die 38 is mounted above the reciprocable cross-head 43 carried up by plungers 44 of hydraulic or other fluid-actuated cylinders 45, by which the cross-head and die are pressed upwardly under the active pressure of the fluid. Cylinders 45 are controlled by the usual three-way regulating valve and supply lines, as will be readily understood.

For the purpose of retaining the extended end 7 of anvil block 39 against pressure during the forging operation, it is engaged by the cross bar or bolt 48 of swinging links 49 pivoted to the lower cross bolt 50. The arms 49 are pivotally mounted by bolt 50 in lug 2 extending up from the main frame 42. As shown, terminal 7 of the anvil is provided with a slight concavity or bolt socket 64, for firm engagement of bolt 48, and a key hole 65 provides for insertion of a removable cross key, further preventing accidental disengagement under pressure.

The arms 49 as thus mounted are rotatably connected with the cross bolt 50 having the toothed segment 51 engaged by rack 52. The rack in turn is connected with the plungers of alternately operable fluid pressure cylinders 53—54 in one direction or another, under the control of suitable valves and supply and exhaust pipes, not necessarily shown herein. A counterweight 31 is secured to one end of shaft 50 and balances the weight of arms 49 as they are lowered.

The anvil block 39 extends forwardly from the crosshead 40 above the lower die 38 with free clearance space for insertion of the blank when the arms 49 are lowered. During operation, such space is closed and the end of the anvil block is retained against welding pressure, when the blank is inserted and the arms are thrown up, as in Fig. 1. In this respect, the arms 49 constitute an opening and closing gate member. The anvil block is counter-balanced at the other end by an extension 4 and retaining bolt 5 secured in extended lug 6 projecting from the rear end of the main frame.

Die 37 is secured to the under side of its anvil block by a dovetail key 10 or other suitable means, providing for longitudinal placement and removal, and die 38 is secured by bolts to cross-head 43, by slots 11 therein, of well known construction. A horn 14 extends forwardly from cross-head 43 between the arms 49, by which they are maintained against lateral movement, thus ensuring accurate swinging of the bolt 48 over extension 7. The horn is slightly tapered at each side towards its front end, as in Fig. 2, facilitating upward swinging of the arms 49 and ensuing engagement with the extension 7. A similar extension 15 of the cross-head 43 rides between the columns 41, and the cross-head is thus maintained in its vertical movement under action of the vertically moving plungers 44.

In Figs. 9 and 10, I show a modified construction for retaining the anvil 39 at its free end. In such case, the anvil extension 7$^a$ is provided with a cross hole 56 for reception of a retaining bolt 57 which connects the anvil extension with the side members 58 of a clevis extension 59 of a hydraulic plunger 60 of double-acting cylinder 61 mounted on the front of the main frame 42. Supplemental guide plungers 62 of cylinders 63 may be utilized to assist in raising, lowering and guiding the clevis, as will be readily understood, with suitable pressure connections, valves, etc.

The operation is as follows:

When the overlapping edges 12—13 of the blank have been sufficiently heated and the blank is carried to bring the heated overlapping edges between the dies 37—38, arms 49 are quickly thrown upwardly to holding position, as in Figs. 1 and 2. Thereupon, pressure is supplied to cylinders 45, effecting upward movement of cross-head 43 and die 38, when the welding operation is effected throughout the full length of the seam.

In such operation, the entire blank C is lifted vertically through the range of any necessary lost motion, bearing necks 34 being thrust upwardly from bearings 33. When the welding operation is complete and die 38 lowered, the original position will be assumed with the blank resting backwardly by gravity against the inclined face of the buggy 29. Thereupon, arms 49 are again thrown down, as in Fig. 5, and the buggy is shifted backwardly, when the welded blank may be removed by a crane or other suitable mechanism.

As shown, the dies 37 and 38 are curved to approximately the curvature of the already bent overlapping portions 12, 13. As these are brought together under the very heavy pressure of the hydraulic cylinders, the contacting faces are pressed against each other and into very compact and intense welded connection. For the purpose of reinforcing the lower die 38 and of further supporting and guiding the blank at each side, die 38 is provided with upwardly extending horns or projections 55, adapted to embrace and support the blank at each side during the welding operation. The lines of force under pressure being vertical, the meeting faces at each side of the center are at an abrupt slope, approximating 45 degrees to the vertical at their outer portions, and rounding inwardly towards the center, as shown, making the rounded corner joint seam.

In this manner, the lines of force are mainly diagonal to the plane of contact so that there is a very intimate joint formed between the fibres of the metal. Incidentally, the thickness of each plate at the welded portion is somewhat reduced, as indicated in Fig. 7, resulting in a slight corresponding elongation of the welded sections. The resulting welded joint is extremely strong and very evenly and thoroughly joined throughout, forming a practically integral or homogeneous connection. In fact, breaking tests of welded metal seams of the kind involved have resulted in fractures beyond the weld, without any disturbance of the welded metal.

If it is desired to swage down the shoulder of either terminal edge, either inside or out, after the weld is made, a separate swage block or supplemental die 16 may be inserted by handle 17, between either die and any projecting metal portion 18. With such a block inserted, and properly shaped to conform to the die face and the desired curvature of the other already treated faces of the blank, a further pressing action of the machine will effect swaging out of the surplus metal, as indicated at 19, Fig. 8, giving a smooth continuous inside curved surface.

By such treatment, either the inside or outside of the box may be brought down for interfitting connection with the cover, or any similar adjustment or fitting. It will be understood, of course, that one or more thicknesses of metal may be acted upon in the manner described, for bending only, if desired.

The advantages of the invention reside in the ease and cheapness of the operation, and the rapidity with which it may be performed. The machine may, of course, be designed to make varying kinds of welded joints, and is in no way limited as to size or shape of the material, but may be adapted to a wide range of application.

What I claim is:

1. A machine of the kind disclosed having an upper anvil extending from a fixed support at one end, an upwardly pressing coacting reciprocable lower die, and removable means for supporting the other end of the anvil.

2. A machine of the kind disclosed having a base, a support extending upwardly therefrom, an upper anvil carried by said support and extending therefrom, a reciprocable die and means for actuating it mounted on the base, and a movable supporting gate member connecting the other end of the anvil with the base.

3. A machine of the kind disclosed having a base provided with a reciprocable die and means for actuating it, a superimposed anvil, a support at one end of the base extending upwardly and engaging one end of the anvil, and means for connecting the other end of the anvil with the base and for opening and closing the space between the anvil and the reciprocable die.

4. In combination, an upper anvil, a lower base, a reciprocable upwardly pressing die mounted on the base below the anvil, a supporting member for one end of the anvil extending upwardly from the base, and an opening and closing gate member for connecting the other end of the anvil with the base.

5. In a welding machine, an upper anvil die having a permanent support at one end and a movable support at the other, a lower upwardly pressing coacting reciprocable die, and means for actuating it.

6. A welding machine provided with an upper anvil block having a fixed supporting member at one end and a movable supporting member at the other end adapted to be lowered for introduction of a blank or die therein, and a lower upwardly pressing coacting die carrier and die having means for advancing it towards the anvil die.

7. A welding machine consisting of a base provided with lifting mechanism, a cross-head thereon provided with a welding die, a superimposed anvil provided with a coacting die, means supporting one end of the anvil upwardly above the welding die, and a movable retaining arm for the other end of the anvil.

8. A welding machine consisting of a base provided with lifting mechanism, a cross-head thereon provided with a welding die, a superimposed anvil provided with a coacting die, means supporting one end of the anvil upwardly above the welding die, a movable retaining arm for the other end of the anvil, and means connecting said arm with the anvil.

9. A welding machine consisting of a base provided with lifting mechanism, a cross-head thereon provided with a welding die, a superimposed anvil provided with a coacting die, means supporting one end of the anvil upwardly above the welding die, and a pivoted retaining arm for the other end of the anvil.

10. A welding machine consisting of a base provided with lifting mechanism, a cross-head thereon privided with a welding die, a superimposed anvil provided with a coacting die, means supporting one end of the anvil upwardly above the welding die, a pair of arms pivoted to the base having a cross bolt for engaging the other end of the anvil, and means for raising and lowering said arms.

11. A welding machine consisting of a base provided with lifting mechanism, a cross-head thereon provided with a welding die, a superimposed anvil provided with a coacting die, means supporting one end of the anvil upwardly above the welding die, a pair of arms pivoted to the base having a cross bolt for engaging the other end of the anvil, a balancing counterweight therefor, a motor, and gearing connecting the motor with the arms for raising and lowering them.

12. A welding machine consisting of a base provided with lifting mechanism, a cross-head thereon provided with a welding die, a superimposed anvil provided with a coacting die, means supporting one end of the anvil upwardly above the welding die, a pair of arms having an inner supporting and pivoting bolt journalled on the base and an outer cross bolt for engaging the other end of the anvil, a counterweight and a toothed segment secured on said bolt, a toothed rack bar engaging the segment, and fluid-actuated means for moving the rack bar back and forth.

13. In combination with an overreaching anvil block having means supporting it at one end and a holding terminal at the other end provided with a key recess and a bolt socket, a pair of pivoted retaining arms having a terminal bolt adapted to engage the terminal and bolt socket, and to be held by a retaining key for insertion in the key recess.

14. A welding machine having a base provided with a reciprocable die and means for actuating it, supporting columns at one end portion of the base having a cross-head, an anvil mounted thereon extending over the reciprocable die and holding an anvil die, means for opening and closing the entrance space between said dies adapted to engage the other end of the anvil, and a supplemental support for the anvil beyond the cross-head.

15. A welding machine having a base provided with a reciprocable die and means for actuating it, supporting columns at one end portion of the base having a cross-head, an anvil mounted thereon extending over the reciprocable die and holding an anvil die, means for opening and closing the entrance space between said dies adapted to engage the other end of the anvil, an extension of the anvil beyond the cross-head, and a retaining bolt connected therewith and with the base.

In testimony whereof I hereunto affix my signature.

PERCY E. HUNTER.